Aug. 10, 1965   J. N. FUNK ETAL   3,199,368
AIRCRAFT THROTTLE HAVING ADJUSTABLE, OVERPOWERABLE GATE
Filed May 7, 1962   3 Sheets-Sheet 2

INVENTOR.
JACK N. FUNK
JAMES R. HORSNELL
BY
ATTORNEY

INVENTOR.
JACK N. FUNK
JAMES R. HORSNELL
BY
ATTORNEY

United States Patent Office

3,199,368
Patented Aug. 10, 1965

3,199,368
AIRCRAFT THROTTLE HAVING ADJUSTABLE, OVERPOWERABLE GATE
Jack N. Funk and James R. Horsnell, Wichita, Kans., assignors to The Boeing Company, Wichita, Kans., a corporation of Delaware
Filed May 7, 1962, Ser. No. 192,647
14 Claims. (Cl. 74—526)

The present invention concerns a gate system for aircraft throttle levers particularly designed to prevent accelerating to a level of thrust producing a dangerous nose-high condition in an aircraft. The structure disclosed includes a gate member mounted on the throttle guide frame in front of the throttle levers. Adjustable latching and indexing means are provided for setting the gate to the maximum safe throttle limit for the aircraft in conditions of aircraft weight, altitude, ambient temperature, etc. The latching system for the gate is immediately overpowerable by manual force applied to the throttle levers so that the levers can be moved to positions of maximum thrust under emergency conditions.

Improvements in jet aircraft engines have resulted in thrust to weight ratios in the magnitude of one or greater. In some aircraft the thrust passes substantially through the CG of the aircraft, i.e., in single in-line engine fighter aircraft. However, in most jet aircraft the thrust is directed on a line below the CG even if the engines are buried in the wings and most particularly if the engines are underslung from the wings on pods. The thrust thus is applied on a line that may have a substantial moment arm relative to the CG of the aircraft. If the available thrust is not too great, the pilot can prevent assumption of a dangerous nose-high aircraft attitude during acceleration by use of aircraft control surfaces. However, with thrust ratios in the order of one or higher, the acceleration to maximum thrust may result in a rate of change aircraft attitude too fast to be compensated by aircraft controls before the aircraft is in trouble in a nose-high position. This is particularly a problem during take-offs, touch-and-go maneuvers, and go-around flights including those after unsuccessful landing approaches, etc., where the pilot may use maximum thrust to rapidly accelerate the aircraft. In proximity to the ground it is particularly dangerous to reach an untenable nose-high attitude. The problem is aggravated during rapid airplane acceleration by rearward CG shift due to movement of fuel to the rear of fuel tanks. It is an object of our invention to provide a gate usable to prevent, unless overpowered, advancing throttle to a level where an excessive nose-high attitude is produced.

Because of the variable factors of airplane gross weight, ambient temperatures, and altitudes, the thrust limit is also variable that will keep aircraft within safe control limits during take-off, touch-and-go, and go-around maneuvers. It is an object of our invention to provide a gate that is adjustable for the aircraft condition as to the above and any other factors.

The gate should provide a readily sensed limit, e.g., the pilot tactually senses the stop when the throttle levers are moved thereagainst. However, the gate must be capable of being immediately overpowered to allow full thrust with nothing more than an abrupt forward force within pilot manual force limitations. It is an object of our invention to provide a gate that can be manually immediately overpowered to provide maximum throttle in emergencies.

While the gate was developed to take care of the circumstances above described, it is found that the gate is a tool, which, when available on an aircraft for the above purposes, is useful for additional purposes. One example is the use of the gate to avoid over-boosting the engine. For example, the aircraft may be engaged in a maneuver at such altitudes or of such type that assumption of a nose-high attitude is not a problem. However, the maneuver may involve accelerating from moderate to near full thrust and, unless controlled, may result in over-boosting the engine. During such maneuvers the pilot may have many instruments to monitor and tasks to perform so that it is undesirable to have to monitor the engines to prevent over-boosting conditions. The present gate system can be used to preset a limit in such maneuver which, if exceeded, might over-boost the engine. It is an object of our invention to provide a novel gate member adapted for selective positioning for a variety of additional maximum throttle limiting functions.

Additional objectives include the provision of a novel, simple, economical, reliable, and low-weight gate system adapted to best achieve the functions and objectives described above.

Additional objectives and advantages of the invention will be explicit or implicit from the following description.

Figure 5:
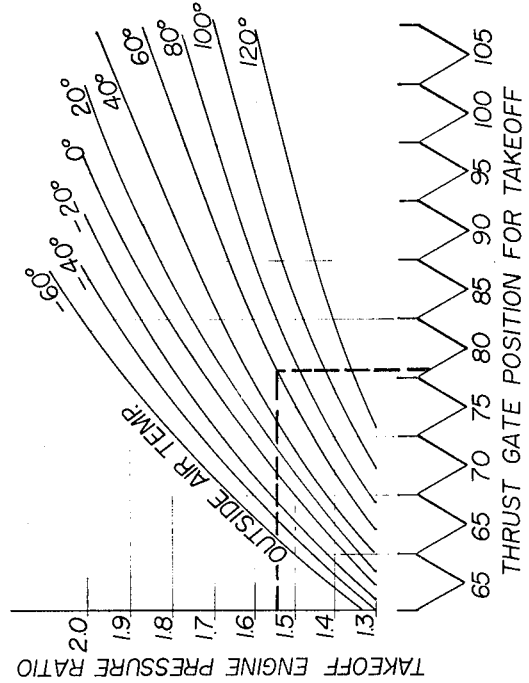
Figure 4:
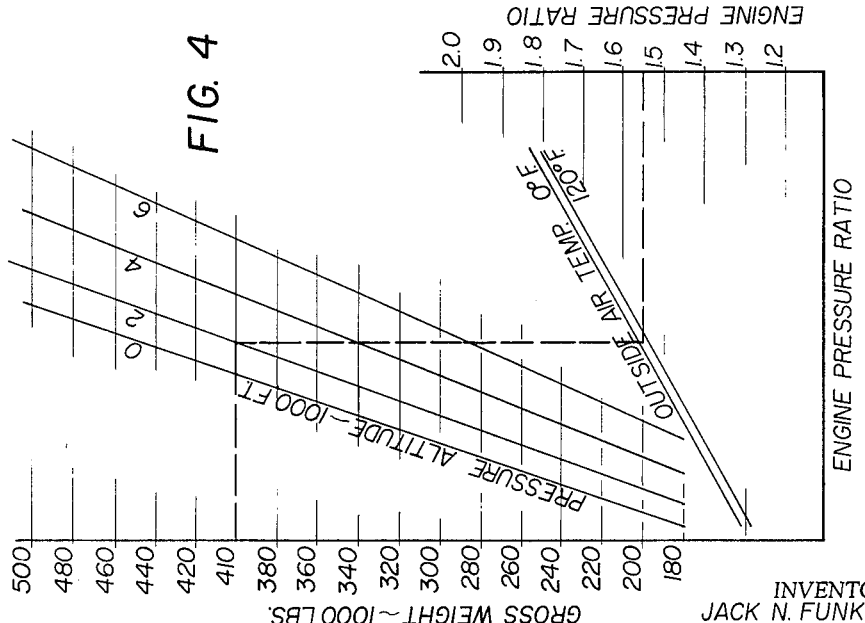

FIGURES 4 and 5 are graphs usable in setting a gate member on a model aircraft. FIGURE 4 relates gross weight, altitude, and temperature, to find engine pressure ratio. FIGURE 5 relates the engine pressure ratio, found in the FIGURE 4 graph, and temperature, to find a calibrated angular scale setting for the position of a thrust gate in the throttle assembly of the model aircraft.

Figure 1:
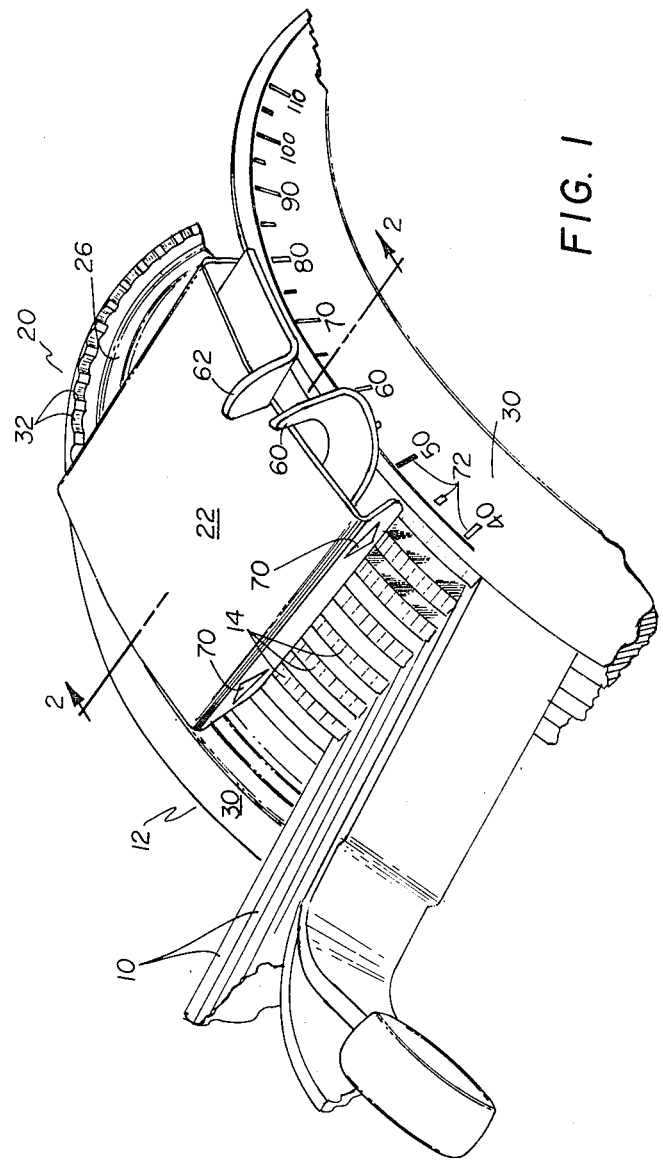
FIGURE 1 is a fragmentary perspective view of a throttle lever-guide frame assembly incorporating a gate system forming a specific embodiment of our invention.
Figure 2:
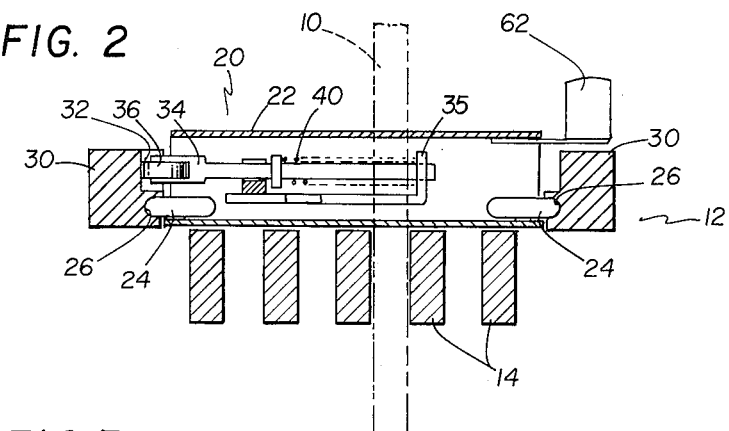
FIGURE 2 is a fragmentary view, partly in section, taken generally on line 2—2 of FIGURE 1.
Figure 3:
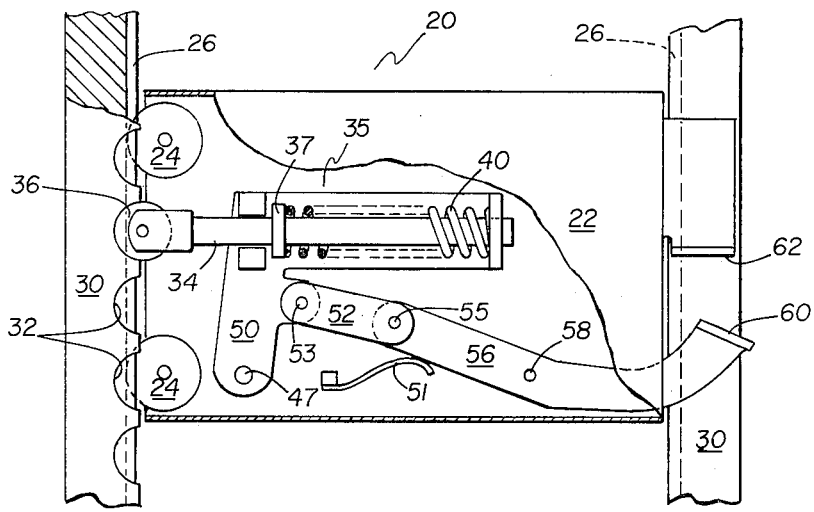
FIGURE 3 is a plan view, fragmentary and partly in section, showing the gate system and related guide frame structure.

Most of the structure of the throttle levers and throttle guide frame shown in the drawings is conventional and the invention is adaptable to various throttle lever assemblies of aircraft and the like. Such conventional structure not a part of this invention, or necessary to disclose it, is omitted. FIGURE 1 shows a multiplicity of throttle levers 10 pivotally mounted about a common axis therebelow (not shown). The throttle levers are disposed side by side to pivot in juxtaposed arcuate paths from minimum to maximum throttle or thrust. A graduated guide frame 12 is provided having parallel arcuate guide members 14 interfingered with levers 10 for guidance thereof.

A gate system 20 is provided at the upper, forward portion of the guide frame at the maximum throttle end of the paths of travel of the throttle levers. Gate system 20 has a housing 22 supporting at each corner roller members 24 which are disposed in grooves 26 provided in arcuate side bars 30 of the guide frame whereby the gate is guidably supported to be moved in a path fore and aft of the guide frame 12 from a position forward of the maximum thrust positions of throttle levers 10 (where the gate will not interfere with the levers) to selected rearward positions in which the gate will limit movement of levers 10 to less than maximum throttle positions.

Latching means are provided to secure the gate in selected thrust limiting positions. The latching means includes a series of indentations 32 formed in one of the side bars 30 and a latch piece 34, slidably mounted in a guide housing 35, having a roller tip 36 engageable in indentations 32. Latch piece 34 is normally biased into engagement with the indentations by compression spring 40 bearing between an end of guide housing 35 and an abutment 37 on latch piece 34. The latch is manually released for movement of the gate to selected positions by a release system including: an arm 50 on housing 35 pivoted to housing 22 at 47, whereby housing 35 may be pivoted about pivot 47 to move roller tip 36 of latch piece 34 out of engagement with indentations 32; and a pivotal connecting segment or link 52 pivoted at 53 to arm 50 and at 55 to crank or lever 56 respectively. Crank 56 is pivoted about bolt 58. Crank 56 has a movable finger piece 60 and a fixed finger piece 62 is secured to housing 22 whereby crank 56 is pivoted upon squeezing finger pieces 60, 62 together, whereby, through linkage 52, housing 35 is pivoted so that latch piece 34 is moved to release roller tip 36 from engagement with indentations 32. Pivot joints 53, 55, 58 have a toggle relationship whereby pivot 55 is normally locked over center (above a line between pivots 53 and 58 as viewed) and whereby the toggle relationship is broken as finger pieces 60, 62 are squeezed (moving pivot 55 down as viewed past a line between pivots 53, 58). Spring 51 normally acts on the toggle joint to hold the links in locked position.

Indicia are provided so that gate 20 can be positioned appropriately, which is shown as arrows 70 on the rear end of housing 22 and angular readings 72 inscribed on side bars. A table or a graph may be used to relate the degrees on scales 72 to safe maximum thrust levels for each condition of the aircraft, as will be described below in connection with FIGURES 4 and 5.

Although the maximum thrust selected will be optimized for each aircraft condition, it would not be safe to make this an absolute limitation so that the throttles could not be immediately advanced past that limit. By the expression *immediate* is meant avoidance of delay beyond psycho-physiological response; and this may be distinguished from the built-in delay mechanism in Patent 2,664,762. For example, the aircraft may get in trouble for one of a number of reasons and the pilot need to apply maximum thrust even at the risk of getting a nose-high attitude. The pilot must be able to immediately overcome the gate in such circumstances. Another example would be if one or more of the engines went out so that the gate no longer related to actual thrust conditions and little more than enough power was available to avoid crashing even if all the remaining engines were advanced to full throttle. A further factor is that the limit set by the thrust gate will not exactly represent the limit of safe operation as a conservative design will calibrate the gate thrust limit somewhat below the true limit, yet in an emergency the pilot may need to advance the throttle to the true limit of safe operation or beyond.

The gate is immediately overcome within pilot manual force limits by the structure shown in the drawings in which the value of spring 40, the size of roller tip 36, the profiles of indentations 32, etc., are such that the latch can be cammed out of engagement with the indentations upon application of sufficient force of the throttle levers 10 against gate housing 22.

FIGURES 4 and 5 form an example of the process of determining the appropriate gate setting for a particular model aircraft. FIGURE 4 relates gross weight, altitude, outside air temperature, and engine pressure ratio (which is a fair measurement of thrust). FIGURE 5 relates the value of EPR from FIGURE 4 to temperature to determine an appropriate setting of the gate relative to an angular scale 72 on the guide frame side rail.

For example, assuming a take-off weight of 400,000 pounds, a 2,000 foot altitude airport, and an ambient temperature of 60°, the dotted lines on FIGURE 4 show that an EPR of 1.55 is found. The dotted lines on FIGURE 5 show that the gate should be set in with the latch piece 34 engaged with the indentation 32 in line therewith when the pointers 70 point at 80 on scales 72. Appropriate EPR values are determined experimentally in forming the graphs of FIGURES 4 and 5, and are those values which may be accelerated to at the aircraft conditions without assumption of excessive nose-high attitudes.

Having thus specifically described our invention, we do not wish to be understood as limiting ourselves to the precise details of construction shown, but instead wish to cover those modifications thereof that will occur to those skilled in the art from our disclosure and that fairly fall within the scope of our invention, as described in the following claims.

We claim:
1. In a multi-throttle control for aircraft power plants having a series of separate throttle levers disposed side by side and pivotal about a generally common axis in juxtaposed arcuate paths from minimum to maximum throttle and a graduated guide frame for said levers spaced above said axis having juxtaposed parallel arcuate guide members interfingered with said levers for guidance thereof, an overpowerable gate, comprising:

said guide frame having a pair of side bars having guide and retaining grooves in their opposed faces, a gate member disposed in front of said levers having a pair of roller members mounted on opposite sides thereof disposed in said grooves in such a manner that said gate member is movable fore and aft of said guide frame from positions blocking movement of said levers to maximum throttle position, to a forward position permitting movement of said levers to maximum throttle position, one of said bars having a series of indentations formed in its face extending in a fore and aft direction, said gate member having slidably transversely mounted therein a latch member movable between a position out of said indentations and a position engaged in one of said indentations, spring means in said gate member normally urging said latch member into engagement with said indentations, finger piece means exposed from said gate member and linkage means connecting said finger piece means to said latch member and operable when said finger piece means is operated to withdraw said latch member from the location of said indentations for adjustable location of said gate member blocking advancement of said throttle levers to maximum throttle position, and graduated indicia located on said gate member and said guide frame for locating each position of said gate member engaged in the indentations for setting various maximum thrust limitations, and said spring means and the shape of said indentations and latch member being such that said latch member can be immediately cammed out of the indentations by sufficient force applied on said gate member by said levers within pilot manual force limitations, to overpower said gate for movement of said throttle levers to positions of maximum throttle past the limit set by said gate member.

2. In a throttle control for aircraft power plants having a throttle lever pivotal about an axis in an arcuate path from minimum to maximum throttle and a graduated arcuate guide frame for said lever spaced above said axis, an overpowerable gate, comprising:

said guide frame having a pair of side bars having guide and retaining grooves in their opposed faces, a gate member disposed in front of said lever having roller means mounted on opposite sides thereof disposed in said grooves in such a manner that said gate member is movable fore and aft of said guide frame from a position blocking movement of said levers to maximum throttle position, to a forward position permitting movement of said levers to maximum throttle position, one of said bars having a series of indentations formed in its face extending in a fore and aft direction, said gate member having slidably and transversely mounted therein a latch member movable between a position out of said indentations and a position engaged in one of said indentations, spring means in said gate member normally urging said latch member into engagement with said indentations, means manually operable to withdraw said latch member from the location of said indentations for adjustable location of said gate member blocking advancement of said throttle lever to maximum throttle position, and indicia located on said gate member and said guide frame for locating each position of said gate member engaged in the indentations for setting various maximum thrust limitations, and said spring means and the shape of said indentations and latch member being such that said latch member can be immediately cammed out of the indentations by sufficient force applied on said gate member by said lever within pilot manual force limitations, to overpower said gate for movement of said throttle lever to position of maximum throttle past the limit set by said gate member.

3. In a multi-throttle control for aircraft power plants having a series of separate throttle levers disposed side by side and pivotal in juxtaposed arcuate paths from minimum to maximum throttle and an arcuate guide frame for said levers spaced above the pivotal axes of said levers, an overpowerable gate, comprising:

said guide frame having a pair of side bars and a gate member disposed in front of said levers and engaging means between said gate member and said side bars in such a manner that said gate member is movable in and confined to a path back and forth within said guide frame from positions blocking movement of said levers to maximum throttle position, to a forward position permitting movement of said throttle levers to maximum throttle position, said gate member having movably mounted thereon a latch member and one of said side bars having a series of latching means extending fore and aft of said guide frame in which said latch member may be engaged for latching said gate member in various positions along said guide frame, for adjustable location blocking advancement of said throttle levers toward maximum throttle positions, and spring means normally urging said latch member into engagement with said latching means, and said spring means and the shape of said latch member and latching means being such that said latch member can be immediately cammed out of engagement with said latching means by sufficient force applied on said gate member by said levers within pilot manual force limitations, to overpower said gate for movement of said throttle levers to positions of maximum throttle past the limit set by said gate member.

4. In a throttle control having a series of throttle levers pivotal about pivot axes in arcuate paths to adjust throttle position and a guide frame for said throttle levers spaced above the pivotal axes of said throttle levers, a gate, comprising:

a gate member disposed in the path of travel of said throttle levers, engaging means disposed between said gate member and said guide frame formed in such a manner that said gate member is movable within said guide frame from positions blocking movement of said throttle levers to maximum throttle position to a position permitting movement of said throttle levers to maximum throttle position, said gate member and said guide frame having interenengaging latch means operative to latch said gate member selectively in any one of a number of positions within said guide frame for blocking movement of said throttle levers in the direction of increasing throttle, and indicia between said gate member and said guide frame for locating the gate member in each of said number of positions.

5. In a throttle control having a throttle lever pivotal about an axis in an arcuate path to adjust a throttle and a guide frame for said lever spaced above said axis, an overpowerable gate, comprising:

a gate member disposed in the path of travel of said throttle lever, engaging means disposed between said gate member and said guide frame formed in such a manner that said gate member is movable in a path within said guide frame and is restrained from movement outside of said path, said gate member and said guide frame having interengaging latch means operative to latch said gate member selectively in any one of a number of positions within said guide frame or blocking movement of said throttle lever in one direction in said arcuate path, and indicia on said gate member and said guide frame for locating said gate member in each of said number of positions, and said latch means being operable to be immediately overcome by force applied by said throttle lever within manual force limitations on said throttle lever, to overpower said gate for movement of said throttle lever to a position past the limit set by the position of said gate before it is overpowered.

6. In a throttle control for a power plant of an aircraft having a series of throttle levers pivotally mounted side by side to pivot in arcuate paths to control various engines of said aircraft power plant, and a guide frame for said levers disposed above the pivotal axes of said levers, the improvement, comprising:

a gate member positioned in front of said levers and guidably supported by said guide frame, securing means for said gate member operable for securing said gate member selectively in any one of a number of positions formed along said arcuate paths, each of said positions being the maximum thrust position for said aircraft power plant without endangering said aircraft by producing a nose-high attitude beyond a limit selected as being safe when the aircraft is rapidly accelerated to said maximum thrust position, and indicia identifying each position of said gate member usable for locating said gate member correctly for each aircraft condition, and said securing means being capable of being immediately overcome by manual force applied to said throttle levers so that said gate member can be displaced out of said arcuate paths to permit higher levels of thrust under emergency conditions than established by said gate member.

7. In a throttle control for a power plant of an aircraft having a throttle lever pivotally mounted to pivot in an arcuate path about an axis to control said power plant, and a guide frame for said lever above said pivotal axis, the improvement, comprising:

a gate member positioned in front of said lever and guidably supported by said guide frame, latch means for said gate member operable for latching said gate member selectively in any one of a number of positions formed along said arcuate path, each of said positions being the maximum thrust position for a condition of said aircraft, and indicia identifying each position of said gate member usable for locating said gate member correctly for each aircraft condition, and said latch means being capable of being immediately overcome by manual force applied to said throttle lever so that said gate member can be displaced to permit higher levels of thrust under emergency conditions 8. In a throttle control for a power plant of an aircraft having a series of throttle levers disposed side by side and pivotal in a juxtaposed arcuate paths from minimum to maximum thrust, the improvement, comprising:

stop means, securing means for said stop means selectively operable to secure said stop means in any one of a number of positions including a position not interfering with movement of said throttle levers to maximum thrust, and including a number of intermediate stop positions limiting movement of said throttle levers toward maximum thrust to a number of lever positions less than maximum thrust, and indicia for said stop means for locating said stop means in said number of intermediate stop positions, said stop means and said securing means being capable of being overcome by manual force applied to said throttle levers so that thrust at higher levels is readily obtainable under emergency conditions.

9. In a throttle control for an aircraft power plant having a throttle lever pivotal in an arcuate path from minimum to maximum thrust, the improvement, comprising:

stop means, securing means for said stop means selectively operable to locate said stop means in a number of positions including a position not interfering with movement of said throttle lever to maximum thrust, and including a number of intermediate stop positions limiting movement of said lever toward maximum thrust to a number of lever positions less than maximum thrust, and indicia for said stop means for locating said stop means in said number of stop positions, and said stop means and said securing means being capable of being immediately overcome by manual force applied to said throttle lever so that thrust at higher levels is readily obtainable under emergency conditions.

10. A manually overpowerable adjustable gate for a throttle lever aisle pedestal for an aircraft having multiple engines, the pedestal having graduated throttle lever guide frame means with a plurality of parallel and laterally spaced throttle lever guide members and a plurality of throttle levers connected to the graduated throttle lever guide frame means, one of the throttle levers being disposed between each pair of the throttle lever guide members, the gate comprising, first and second parallel and laterally spaced arcuate side bars sandwiching the throttle lever guide members therebetween, gate housing means supported by said first and second side bars and disposed ahead of the throttle levers above the throttle lever guide members, said gate housing means being channel-shaped with a web and two parallel legs thereof disposed transversely of the throttle lever guide members, said first and second side bars having arcuate parallel opposed roller grooves formed in parallel faces thereof, at least four wheel-like roller members turnably connected to said gate housing means and rolling in said roller grooves for supporting said gate housing means on said first and second side bars, said roller members each turning about an axis parallel with the radius of said first and second side bars, latch means carried by said gate housing means, latch indentation means formed in said first side bar and comprising a series of arcuate notches parallel to and above said roller groove formed in said first side bar, said latch means including a latch roller wheel resiliently laterally outwardly biased into engagement with one of said notches of said latch identation means of said first side bar, latch release attached to the underside of said gate housing means and having a movable finger piece pivotally connected to the underside of said gate housing means and extending laterally outwardly over said second side bar for being pressed to release said latch means by urging said latch roller wheel out of engagement with said latch identation means, and a fixed finger piece connected to said web of said gate housing means adjacent said movable finger piece so that said latch roller wheel can be retracted by squeezing said movable finger piece towards said fixed finger piece.

11. A manually overpowerable adjustable gate for a throttle lever aisle pedestal for an aircraft having multiple engines, the pedestal having throttle lever guide frame means with a plurality of throttle lever guide members and a plurality of throttle levers connected to the throttle lever guide frame means, one of the throttle levers being disposed between each pair of the throttle lever guide members, the gate comprising, first and second side bars sandwiching the throttle lever guide members therebetween, gate housing means supported by said first and second side bars and disposed ahead of the throttle levers above the throttle lever guide members, said first and second side bars having roller grooves formed therein, wheel-like roller members turnably connected to said gate housing means and rolling in said roller grooves for supporting said gate housing means on said first and second side bars, latch means carried by said gate housing means, latch indentation means formed in said first side bar and comprising notches in said first side bar, said latch means including a latch roller wheel resiliently laterally outwardly biased into engagement with one of said notches of said latch identation means of said first side bar, latch release means attached to said gate housing means and having a movable finger piece connected to said gate housing means and extending outwardly over said second side bar for being pressed to release said latch means by urging said latch roller wheel out of engagement with said latch indentation means, and a fixed finger piece connected to said gate housing means adjacent said movable finger piece so that said latch roller wheel can be retracted by squeezing said finger pieces together.

12. In a multiple engine aircraft, pivotally mounted parallel throttle levers, a pair of parallel and arcuate guide members for each of said throttle levers, first and second opposed arcuate side bars disposed above said guide members, said first and second side bars each having a coplanar arcuate groove formed in an opposite side thereof, gate housing means having two pairs of rotatably mounted rollers connected thereto, one pair of said rollers rolling in said groove of said first side bar and the other pair of said rollers rolling in said groove of said second side bar, an arm pivotally connected to the underside of said gate housing means, a crank pivotally connected to the underside of said gate housing means and having a first finger piece on one end thereof extending laterally outside of said gate housing means above said second side bar, a second finger piece fixed to said gate housing means adjacent said first finger piece, a pivotal connecting segment disposed on the underside of said gate housing means with one end pivotally connected to said crank and another end connected to said arm, a leaf spring having one end connected to the underside of said gate housing means and having another end biasing said first finger piece of said crank in a direction away from said fixed second finger piece, a transversely disposed latch piece carried by said arm beneath said gate housing means, a roller rotatably connected to a laterally extending outer end of said latch piece, a series of arcuate notches formed in said first side bar parallel to and above said roller groove formed therein, and a compression spring encircling said latch piece and biasing said latch piece and said latch piece roller into engagement with one notch of said series of arcuate notches, a manual pinching of said first finger piece toward said second finger piece a predetermined distance causing said crank to deflect said leaf spring and said arm to retract said latch piece and to compress said compression spring and thus withdrawing said latch piece roller out of contact with said series of notches and freeing said gate housing means for movement along said first and second side bars to a desired position over the throttle lever guide members, and said compression spring and said series of notches and latch piece roller being selected to permit the overpowering of the same without engaging said first finger piece by applying manual force against the gate through at least one of the throttle levers.

13. In an aircraft, at least one throttle lever, a pair of parallel and arcuate guide members for said throttle lever, first and second opposed arcuate side bars disposed above said guide members, said first and second side bars having opposed coplanar arcuate grooves formed therein, gate housing means having rollers connected thereto rolling in said groove of said first side bar and rolling in said groove of said second side bar, an arm pivotally connected to said gate housing means, a crank pivotally connected to said gate housing means and having a first finger piece on one end thereof extending laterally of said gate housing means above said second side bar, a second finger piece fixed to said gate housing means near said first finger piece, a pivotal connecting segment with one end pivotally connected to said crank and another end connected to said arm, a latch piece carried by said arm, notches formed in said first side bar, a spring biasing said latch piece into engagement with one of said notches, a manual pinching of said first finger piece toward said second finger piece a predetermined distance causing said arm to retract said latch piece out of contact with said notches and thus freeing said gate housing means for movement along said first and second side bars to a desired position over said guide members.

14. In an aircraft, at least one throttle lever, a pair of parallel and arcuate guide members for said throttle lever, first and second opposed arcuate side bars disposed above said guide members, said first and second side bars having oppose coplanar arcuate grooves formed therein, gate housing means having rollers connected thereto for limiting movement of said throttle lever and rolling in said groove of said first side bar and rolling in said groove of said second side bar, an arm pivotally connected to said gate housing means, a crank pivotally connected to said gate housing means, a pivotal connecting segment with one end pivotally connected to said crank and another end connected to said arm, a latch piece carried by said arm, notches formed in said first side bar, and a spring biasing said latch piece into engagement with one of said notches and permitting said latch piece to be retracted by pivoting said crank in a direction to compress said biasing spring and thus enabling said gate housing means to be repositioned on said side bars.

References Cited by the Examiner

UNITED STATES PATENTS

| 1,249,755 | 12/17 | Holmgren. |
| 1,331,513 | 2/20 | Lindberg _____ 74—491 X |
| 1,875,229 | 8/32 | Falcke. |
| 2,185,160 | 12/39 | Tampier _____ 74—471 |
| 2,245,852 | 6/41 | Castle _____ 74—526 X |
| 2,435,037 | 1/48 | Gardiner et al. _____ 74—471 |
| 2,522,779 | 9/50 | Culkosky _____ 74—491 X |
| 2,664,962 | 1/54 | Morris _____ 74—565 |
| 2,682,746 | 7/54 | Eagon et al. _____ 74—471 X |
| 2,708,096 | 5/55 | Lindeman et al. _____ 74—527 X |
| 2,793,541 | 5/57 | Borcherdt _____ 74—565 X |
| 2,955,483 | 10/60 | Slomer _____ 74—479 X |

FOREIGN PATENTS

| 91,748 | 3/97 | Germany. |
| 377,532 | 7/32 | Great Britain. |
| 464,686 | 4/37 | Great Britain. |
| 587,822 | 5/47 | Great Britain. |

BROUGHTON G. DURHAM, *Primary Examiner*.